United States Patent
Diedrich et al.

(10) Patent No.: US 11,964,615 B2
(45) Date of Patent: Apr. 23, 2024

(54) FASTENING DEVICE FOR A CONTAINER OF A MOTOR VEHICLE

(71) Applicant: Volkswagen Aktiengesellschaft, Wolfsburg (DE)

(72) Inventors: Mathias Diedrich, Lehre (DE); Mirko Arndt, Sassenburg (DE); Joerg Ohlhoff, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 36 days.

(21) Appl. No.: 17/749,979

(22) Filed: May 20, 2022

(65) Prior Publication Data

US 2022/0371525 A1 Nov. 24, 2022

(30) Foreign Application Priority Data

May 21, 2021 (DE) ...................... 10 2021 205 249.5

(51) Int. Cl.
*B60R 11/00* (2006.01)
*B60K 11/02* (2006.01)

(52) U.S. Cl.
CPC .............. *B60R 11/00* (2013.01); *B60K 11/02* (2013.01)

(58) Field of Classification Search
CPC ................................. B60R 11/00; B60K 11/02
See application file for complete search history.

(56) References Cited

U.S. PATENT DOCUMENTS

| 7,186,068 B2 * | 3/2007 | Zoubek | F16B 21/086 411/510 |
| 8,336,953 B2 * | 12/2012 | Greb | F04D 29/601 180/68.5 |

FOREIGN PATENT DOCUMENTS

| DE | 8113637 U1 | 9/1981 |
| DE | 19502999 A1 | 8/1995 |
| DE | 19637995 C1 | 1/1998 |
| DE | 10245276 A1 | 4/2004 |
| DE | 10343697 A1 | 6/2005 |
| DE | 102007020928 A1 | 11/2008 |
| DE | 102010023488 A1 | 3/2011 |
| DE | 102012020397 A1 | 4/2014 |
| DE | 102019213146 A1 | 3/2021 |
| KR | 100463454 B1 | 12/2004 |

* cited by examiner

*Primary Examiner* — Jacob M Amick
(74) *Attorney, Agent, or Firm* — Muncy, Geissler, Olds & Lowe, P.C.

(57) ABSTRACT

A fastening device, configured for interlocking attachment in a through-opening of a structural element, wherein the fastening device comprises a contact surface for contact on a first side of the structural element delimiting the through-opening as well as at least one first latching tab and at least one second latching tab, wherein the latching tabs each have at least one latching projection, wherein the latching projections are configured to engage behind the through-opening on a second side of the structural element delimiting the through-opening, wherein the distance of the latching projection of the second latching tab from the contact surface is greater than the corresponding distance in the case of the first latching tab. The fastening device can be, in particular, part of a container, for example of a coolant expansion tank, of a motor vehicle and the structural element part of a body of the motor vehicle.

17 Claims, 5 Drawing Sheets

FASTENING DEVICE FOR A CONTAINER OF A MOTOR VEHICLE

This nonprovisional application claims priority under 35 U.S.C. § 119(a) to German Patent Application No. 10 2021 205 249.5, which was filed in Germany on May 21, 2021, and which is herein incorporated by reference.

BACKGROUND OF THE INVENTION

Field of the Invention

The present invention relates to a fastening device, in particular for fastening a container to a structural element of a motor vehicle.

Description of the Background Art

Various such fastening devices are known from DE 103 43 697 A1, DE 195 02 999 A1, DE 196 37 995 C1, DE 10 2007 020 928 A1 (which corresponds to US 2010/0201160), DE 10 2010 023 488 A1, and DE 10 2012 020 397 A1.

SUMMARY OF THE INVENTION

It is therefore an object of the present invention to provide a fastening device that permits the easiest and most flexible possible fastening of a container to a structural element.

This object is attained with a fastening device that is configured for interlocking attachment in a through-opening of a structural element, wherein the fastening device comprises a contact surface for contact on a first side of the component delimiting the through-opening as well as at least one first latching tab and at least one second latching tab, wherein the latching tabs each have at least one latching projection, wherein the latching projections are configured to engage behind the through-opening on a second side of the structural element delimiting the through-opening. The distance of the latching projection of the second latching tab from the contact surface in this design is greater than the corresponding distance in the case of the first latching tab (which is to say of the latching projection from the contact surface).

On the one hand, such a fastening device and the mating element that interacts therewith, which is to say the through-opening of the structural element, can be produced easily and economically. On the other hand, the construction of the connection between the fastening device and the structural element can be produced easily by an insertion of the latching tabs in the through-opening of the structural element and by a latching of the latching tabs with the structural element by an engagement behind it or by an arrangement of the latching projections outside the through-openings, and thus in overlap with a section on the edge of the second side of the structural element, so that the fastening device, or a container according to the invention that includes this device, can be installed easily and quickly. Furthermore, the different distances of the latching projections of the different latching tabs from the contact surface allow connection of the fastening device to structural elements that have different material thicknesses and thus different depths of the through-openings. It is therefore possible to connect identical fastening devices or identical containers having such fastening devices to different structural elements, which can be, in particular, body panels of a motor vehicle with different sheet thicknesses in the regions encompassing the respective through-openings. Additional effort that the development, production, and provision or storage of different fastening devices or containers would entail can be avoided as a result.

In accordance with an exemplary embodiment of a fastening device according to the invention at least (and preferably exactly) two first and second latching tabs can be provided in each case, wherein at least (and preferably exactly) one second latching tab can be arranged between two first latching tabs and at least (and preferably exactly) one first latching tab can be arranged between two second latching tabs. A connection that provides the best possible support between the fastening device and the structural element is achieved by such an alternating arrangement of the latching tabs, even though possibly the latching tabs of only one type, which is to say the first or the second latching tabs, ensure the interlocking connection as a function of the respective depth of the through-opening of the structural element. In this case it is also possible to provide, in particular, a mutually diagonal arrangement of two first latching tabs and/or two second latching tabs regarding a mating direction or a longitudinal axis of the fastening device, which is defined by the longitudinal extents of the latching tabs.

The latching tabs can have an outer surface that extends in a curve in the transverse direction (which is to say transverse relative to their respective longitudinal extent and oriented in the circumferential direction of the through-opening), by which means the latching tabs, in particular, can advantageously be combined with a circular through-opening of the structural element, which preferably can be provided on account of simplest possible manufacturability. Accordingly, the outer surfaces of the latching tabs further preferably can define a circle or an oval (in particular an ellipse) or represent segments of such a circle or oval. The definition of an ellipse by the outer surfaces of the latching tabs can advantageously be combined with a circular through-opening, especially when, as can be provided, the contact surface of the fastening device lies in a plane or defines such a plane that is inclined or non-perpendicular to the mating direction or the longitudinal axis defined by the longitudinal extents of the latching tabs.

The width and/or the thickness (i.e., the extent in a direction running radially to a longitudinal axis of the through-opening) of the at least one second latching tab preferably can be greater than the corresponding extent (i.e., width or thickness) of the at least one first latching tab. As a result, the at least one first latching tab can be made relatively flexible, which can be advantageous because the at least one first latching tab may possibly remain permanently deflected owing to the relatively short distance between the contact surface and the associated latching projection in the case of a combination with a structural element whose through-opening has a relatively great depth and therefore interacts primarily with the at least one second latching tab.

The contact surface can be formed of a multiplicity of partial contact surfaces that are spaced apart from one another. The partial contact surfaces in this case can be provided, in particular, in an arrangement circling the through-opening of the structural element and/or each be composed of a contact projection that protrudes from a support surface of the fastening device or of the container. A relatively high flexibility of these contact projections can lead to a defined mobility of the fastening device already connected to the structural element, or of the container, which can have an advantageous effect in the course of installation.

The latching projection of each of the latching tabs or of at least one or more of the latching tabs can be designed as the end face or front face of a wedge-shaped section of the respective latching tab, wherein the wedge shape can in particular be designed such that the thickness of the latching tab in this region becomes greater with increasing distance from the free end of the latching tabs. It can be ensured by this means that the latching tab(s) is/are automatically deflected on insertion into the through-opening, which in turn can have an advantageous effect in the course of installation.

The longitudinal extent of the latching tabs can be greater in each case than the shortest distance of the contact surface from the free end of the corresponding latching tab. As a result, relatively great longitudinal extents can be realized for the latching tabs, which has an advantageous effect with regard to their flexibility and, in particular, elasticity. The latching tabs can then be deflected relatively easily in the course of installation or connection of the fastening device to the structural element in order to form the latching connection with the structural element, despite dimensioning that has sufficient load capacity.

A container according to the invention can comprise an additional attachment device that is configured for attachment to the same structural element to which the fastening device is also connected, or to a different, or second, structural element. An especially good securing in place of the container resulting from the connection of both the fastening device and the attachment device to the structural element or structural elements can be achieved by this means. This is especially true when, as is preferably provided, the attachment device is arranged to be spaced apart from the fastening device relative to a longitudinal axis and/or a transverse axis and/or a vertical axis, in particular relative to all three of these body axes, of the container because an advantageous support relative to all of the possible translational and rotational motions of the container can be achieved by this means.

A container according to the invention can be a container for holding a fluid and, in particular, a liquid, for example a cooling liquid of a cooling system of a motor vehicle according to the invention. In particular, a container according to the invention can be an expansion tank of the cooling system, wherein an expansion tank is understood to be a container of the cooling system that is intentionally filled partially with the cooling liquid and partially with a gas, in particular air, in order to compensate for a thermally induced expansion or volume change of the cooling liquid in the cooling system by corresponding variations in the fill height of the cooling liquid in the expansion tank.

A motor vehicle according to the invention can be a wheeled and non-railborne motor vehicle (preferably a passenger car or a truck), in particular.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
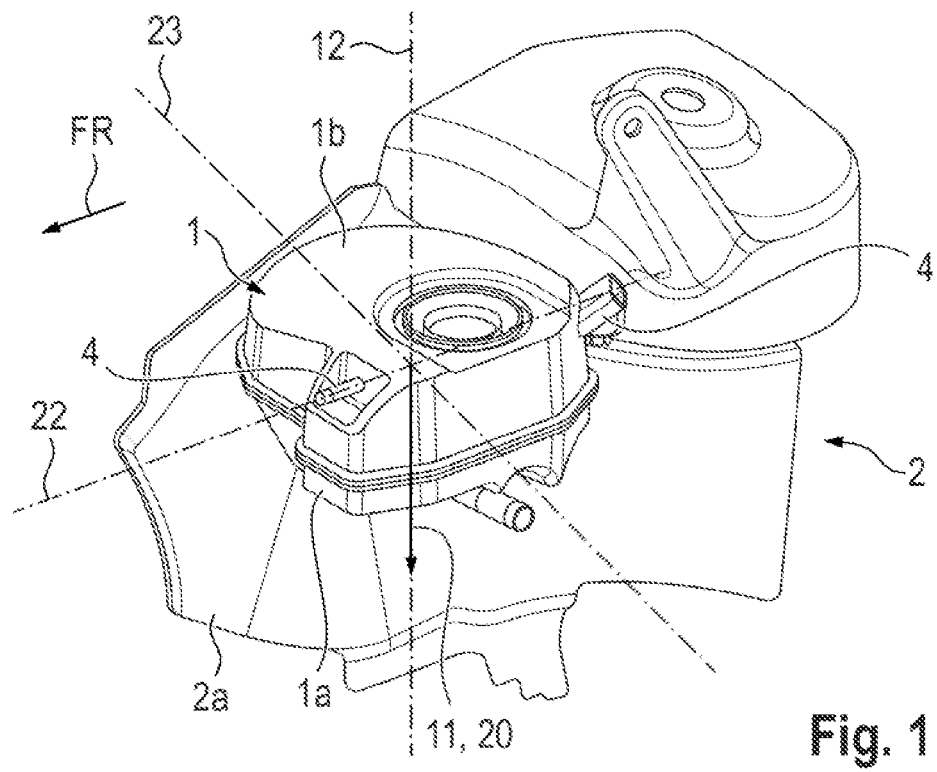
FIG. 1 shows a combination of a container according to the invention and a structural device in the connected state.

The drawings show combinations of a container 1 according to the invention with two different structural devices 2, wherein these structural devices 2, each of which is a part of the body and specifically is a front wheel well of a motor vehicle, differ only with respect to the sheet thickness in the region of a first through-opening 3 that is provided for an attachment of the container 1 and that is formed in a first structural element 2a of the structural device 2.

The container 1 is a coolant expansion tank, which is part of a cooling system that is not otherwise depicted of the motor vehicle, and which comprises multiple fittings 4 through which the container 1 can be connected to lines of the cooling system.

In order to secure the container 1 in place inside an engine compartment of the motor vehicle that also is delimited by the wheel well or by the structural device 2, the container 1 is connected to the structural device 2 such that it is largely immovable. This is achieved on the one hand by means of a fastening device 5 according to the invention that is configured for interlocking attachment in the first through-opening 3, as well as by an additional attachment device 6 that likewise is configured for interlocking attachment in a (second) through-opening 7 formed in a second structural element 2b of the structural device 2.

The container 1 is intended for an essentially horizontal orientation inside the engine compartment (with a horizontal orientation of the motor vehicle). The fastening device 5 according to the invention is located on an underside of the container 1, wherein it is designed as one piece with and of the same material as a bottom part 1a of the container 1. The bottom part 1a is made of plastic, as is a top part 1b of the container 1.

The fastening device 5 comprises six contact projections 9 in an annular arrangement, wherein the contact projections 9 protrude from a support surface 8 of the fastening device 5, which is a section of the underside of the container 1. The contact projections 9 have either T- or I-shaped cross-sectional areas in alternation. In this case, contact projections 9 with T-shaped and I-shaped cross-sectional areas alternate over the course of the annular arrangement. The free end faces or front faces of the contact projections 9 represent partial contact surfaces 10, which together produce a contact surface of the fastening device 5. This contact surface is provided for contact on a section of a (top) first side 17 of the first structural element 2a delimiting the first through-opening 3, by which means the container 1 is supported on the first structural element 2a in the direction of gravitational force.

The contact surface extends in a plane that is inclined or non-perpendicular relative to the direction of gravitational force 11 and thus is also non-perpendicular relative to a vertical axis 12 of the container 1 on account of the intended horizontal orientation of the container 1. This inclined orientation of the contact surface is matched to a correspondingly inclined orientation of the section of the first structural element 2a encompassing the first through-opening 3 in order to achieve full-area contact to the greatest extent possible between the contact surface of the fastening device 5 and the first structural element 2a with the intended arrangement of the container 1 in the engine compartment.

The fastening device 5 additionally comprises four latching tabs 13, likewise in an annular arrangement, that are positioned inside the annular arrangement of the contact projections 9. The latching tabs 13 each have a stem 14 as well as a wedge-shaped head 15, wherein the wedge shape is designed to taper toward the respective free end of the latching tabs 13. A latching projection 16 is formed in the transition between the stem 14 and the head 15 of each latching tab 13. These latching projections 16 are provided to engage behind the first through-opening 3 on the second (bottom) side 18 of the first structural element 2a delimiting the first through-opening 3 for the purpose of connecting the container 1 to the first structural element 2a. When the connection is established, the latching projections 16 of at least some of the latching tabs 13 consequently are in overlap with an edge of the second side 18 of the first structural element 2a delimiting the first through-opening 3, by which means they prevent a detachment of the container 1 from the structural device 2 in a direction opposite the direction of gravitational force 11.

Figure 5:
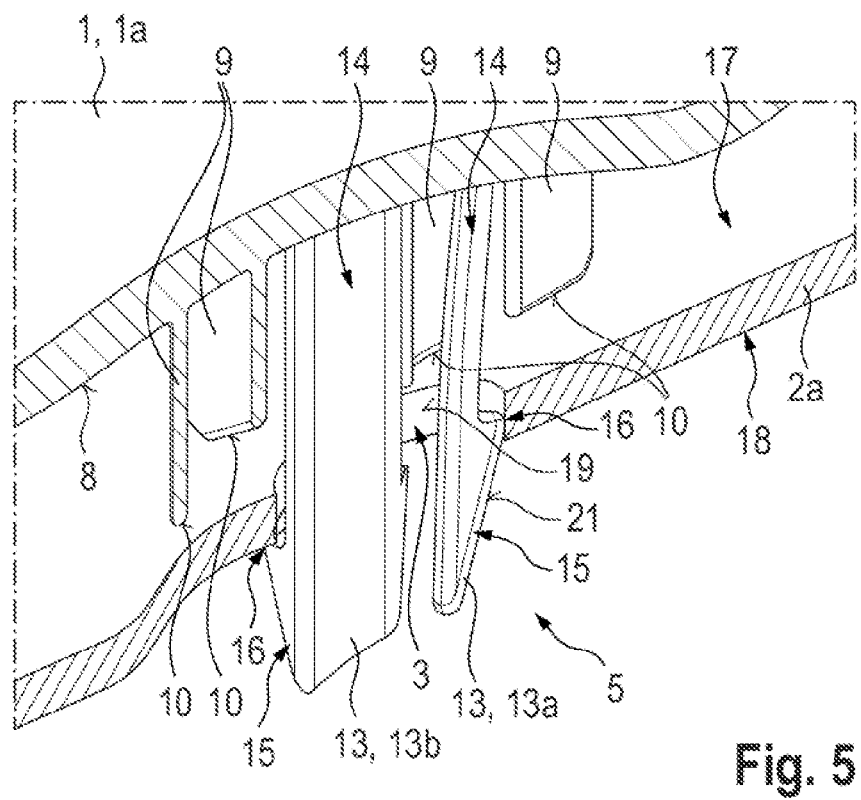
FIG. 5 is a sectional representation of the combination according to FIG. 1 in the region of the fastening device.
Figure 6:
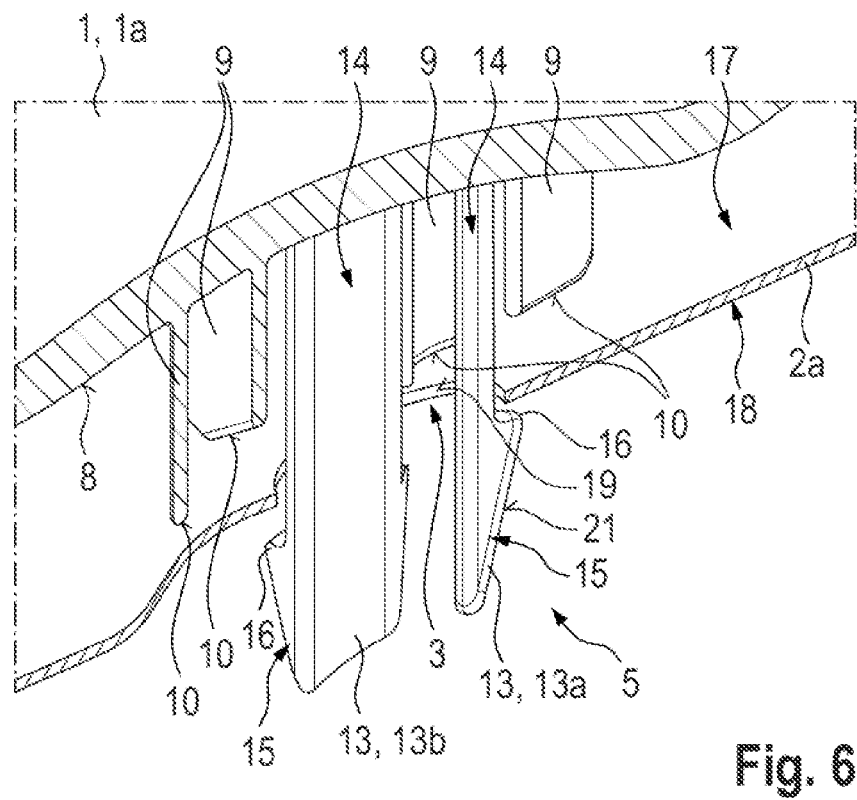
FIG. 6 is a representation according to FIG. 5 in the case of a connection of the fastening device to a different structural device.
Figure 7:
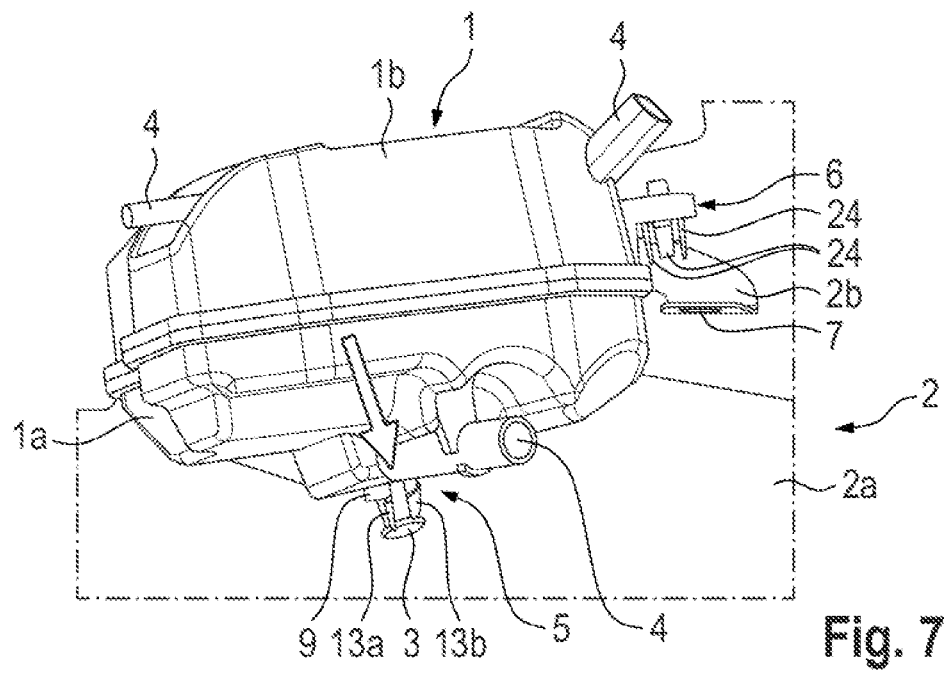
FIG. 7 shows a first step during connection of the container to the structural device of the combination according to FIG. 1.
Figure 8:
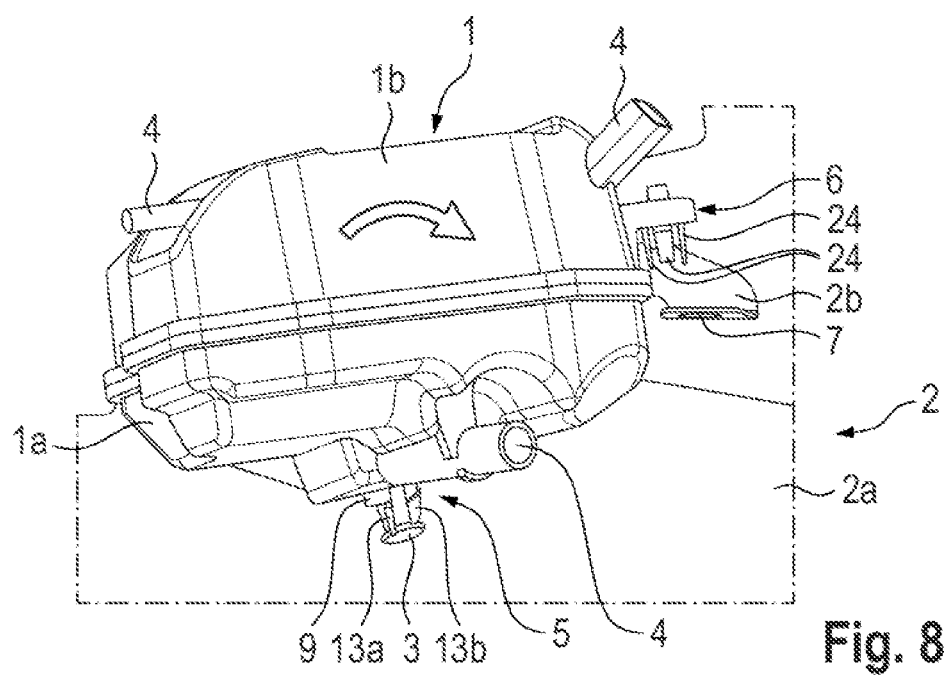
FIG. 8 shows a second step during connection of the container to the structural device.
Figure 9:
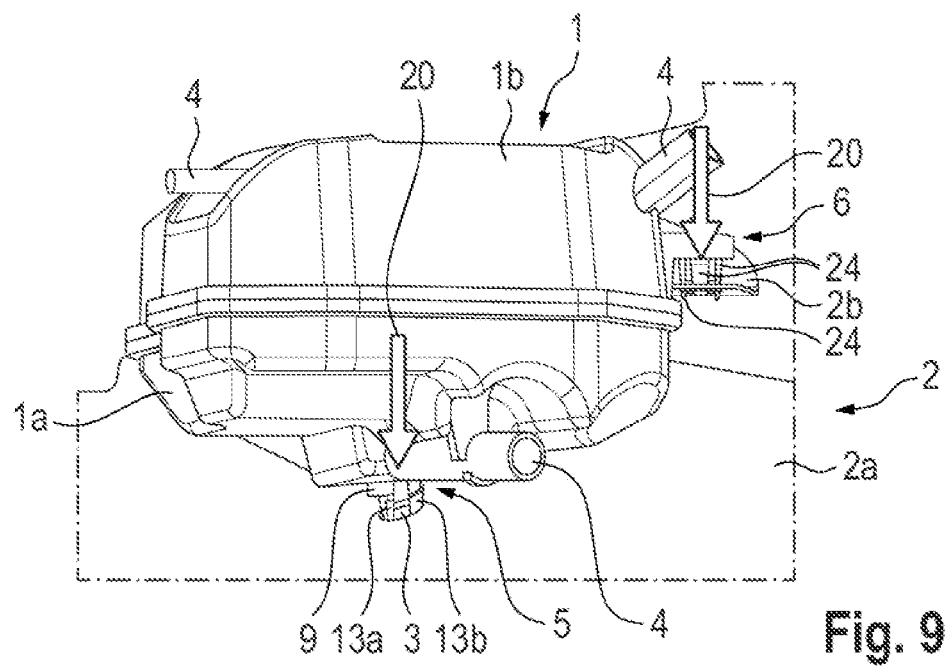
FIG. 9 shows a third step during connection of the container to the structural device.
Figure 10:
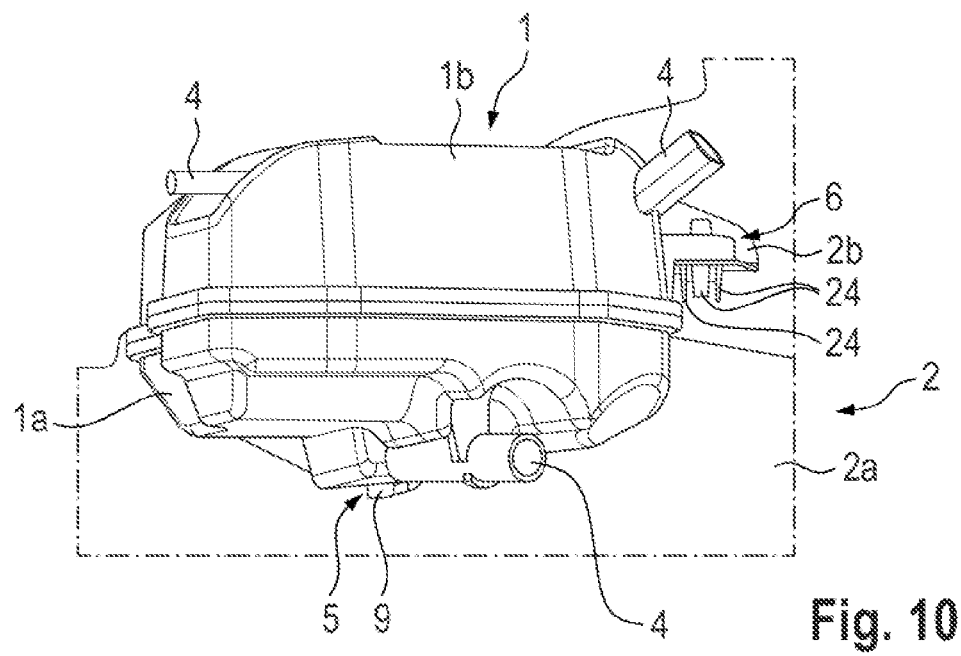
FIG. 10 shows the final position of the container during connection to the structural device.

In order to ensure an advantageous connection in this case to the different structural devices 2, which differ with regard to the sheet thickness of the respective first structural element 2a, two different types of the latching tabs 13 are provided, wherein two first latching tabs 13a have a smaller distance between the relevant associated latching projection 16 and the contact surface than the two other, second latching tabs 13b. As a result, the first latching tabs 13a are optimized for a connection to the first structural element 2a with a relatively small sheet thickness (e.g., 1 mm) by the means that they ensure a defined, but adequately small, clearance of the connection in the connected state (see FIG. 6). The second latching tabs 13b, in contrast, are intended for a connection to the first structural element 2a with a relatively great sheet thickness (e.g., between 2 mm and 3 mm), by the means that the distance between the associated latching projections 16 and the contact surface is sufficiently large to ensure an engagement behind the first through-opening 3 even in the event of such a sheet thickness. The first latching tabs 13a cannot engage behind the first through-opening 3 in this case on account of the relatively small distance of the associated latching projections 16 from the contact surface, and therefore remain in a deflected state due to a contact of the latching projections 16 with the wall 19 delimiting the first through-opening 3 (see FIG. 5).

The different latching tabs 13a, 13b are arranged in alternation, so that in each case a second latching tab 13b is arranged between two first latching tabs 13a and a first latching tab 13a is arranged between two second latching tabs 13b. By this means, and in combination with the preferred number of four latching tabs 13 provided in all, the result is achieved that the two first latching tabs 13a as well as the two second latching tabs 13b are each arranged diagonally opposite one another with respect to the mating direction 20, which corresponds to the direction of gravitational force 11.

The latching tabs 13, which extend essentially straight in the unloaded state, are oriented to be parallel both to one another and relative to the vertical axis 12 of the container 1 as well as the mating direction 20. Accordingly, their longitudinal extents are also oriented to be non-perpendicular or inclined relative to the two sides 17, 18 of the first structural element 2a in the region of the first through-opening 3, and thus also inclined relative to the first through-opening 3 itself. For a combination with the circular or cylindrical first through-opening 3 that fits as well as possible, the outer surfaces 21 of the latching tabs 13 (in the region of the stems 14 as well as the heads 15) define ellipses (see FIG. 4, in particular), by which means an abutting of these outer surfaces 21 of the latching tabs 13 on the wall 19 of the first through-opening 3 that is full-area to the greatest extent possible can be ensured.

Moreover, the latching projections 16 of the different (first or second) latching tabs 13a, 13b, or the end faces of the wedge-shaped heads 15 thereof, also are each arranged in a plane that is non-perpendicular to the mating direction 20 and thus is essentially parallel to the plane within which the contact surface lies.

Figure 3:
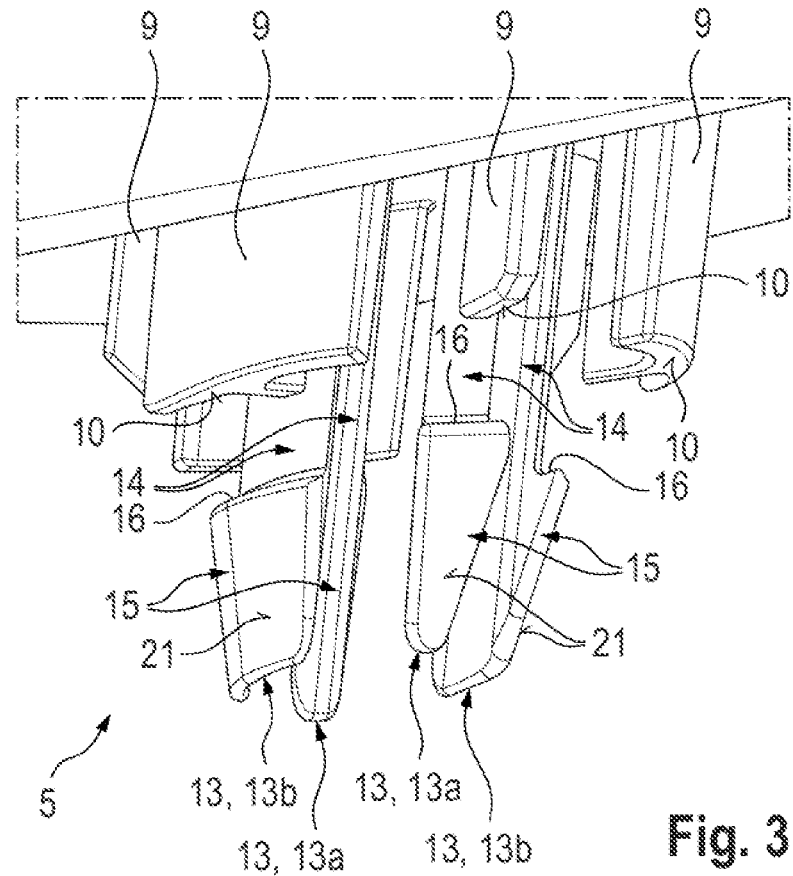
FIG. 3 is a perspective view of a fastening device according to the invention of the container.
Figure 4:
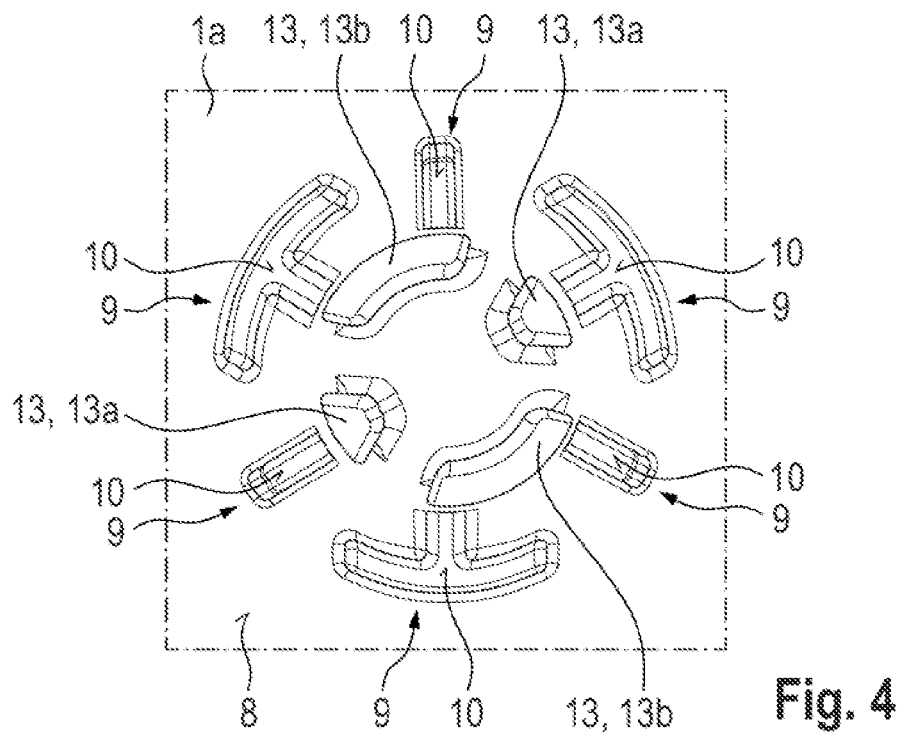
FIG. 4 is a view from below of the fastening device or of a section of the container encompassing the same.

As is evident from FIGS. 3 and 4, in particular, the first latching tabs 13a have widths (extent in the transverse direction or in the circumferential direction relative to the annular arrangement of the latching tabs 13) that are smaller than the widths of the second latching tabs 13b. On the one hand, this design can have an advantageous effect when the first latching tabs 13a remain permanently deflected in the case of a connection of the container 1 to the first structural element 2a with a relatively great sheet thickness. Moreover, the second latching tabs 13b have a relatively high strength and stability on account of the relatively great width, which has an advantageous effect with regard to the most secure possible connection between the container 1 and the structural device 2, because the second latching tabs 13b are the only ones that ensure the interlocking attachment in the case of a connection to the first structural element 2a with a relatively great sheet thickness. In the case of a connection to the first structural element 2a with a relatively small sheet thickness, in contrast, this interlocking attachment is indeed primarily achieved by the first latching tabs 13a, but if one or both of these first latching tabs 13a should fail, the second latching tabs 13b would still also achieve an interlocking attachment, which would merely entail greater clearance in the connection between the container 1 and the first structural element 2a. The first latching tabs 13a are accordingly dimensioned to be relatively thin, which has an advantageous effect with regard to installation or with regard to a reduction in the force that is to be applied for the interlocking attachment of the fastening device 5 in the first through-opening 3 but without significantly reducing the security with regard to the connection of the container 1 to the first structural element 2a.

It is also advantageous with regard to the flexibility of the latching tabs 13 that they have relatively great longitudinal extents. This is achieved by the means that the latching tabs 13, like the contact projections, likewise branch off from the support surface 8 of the fastening device 5 or of the container 1 and thus initially run parallel to the contact projections 9. As a result, longitudinal extents of the latching tabs 13, and in particular also of the stems 14 thereof, are produced that are clearly greater than the (shortest) distances between the contact surface and the free ends of the latching tabs 13.

Figure 2:
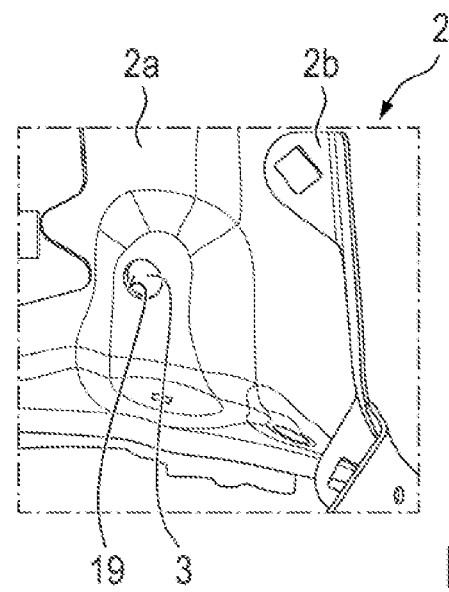
FIG. 2 is a top view of a section of the structural device.

The connection between the container 1 and the first structural element 2a that is achieved by the fastening device 5 and its interlocking attachment in the first through-opening 3 of the first structural element 2a is not sufficient to secure the container 1 in place adequately. This is true at least for forces that act in the directions perpendicular to the direction of gravitational force 11 as well as for torques that act about all of the body axes (which is to say the longitudinal axis 22, the transverse axis 23, and the vertical axis 12) of the container 1. For adequate securing in place, the container 1 therefore includes the additional attachment device 6, which likewise has four latching tabs 24 that are in a rectangular, annular arrangement, wherein the attachment device 6 is attached in an interlocking manner in the second through-opening 7 of the second structural element 2a, which has a rectangular opening cross-section (see FIG. 2), by the means that latching projections of the latching tabs 24 of the attachment device 6 engage behind the second through-opening 7. In contrast to the first structural element 2a, the second structural element 2b, which is connected to the first structural element 2a (for example, welded), does not contribute substantially to the stability of the vehicle body. This makes it possible to use identical second structural elements 2b even in the case of different structural devices 2 that differ with regard to the sheet thickness of the first structural element 2a. A different design of the latching tabs 24 of the attachment device 6 can be avoided as a result.

FIGS. 7 to 10 additionally show various steps during connection of the container 1 to the structural device 2. In a first step according to FIG. 7, the container 1 is positioned for this purpose in such a manner that the fastening device 5 is located above the first through-opening 3. The longitudinal axis 22 of the container 1 can be oriented essentially parallel to the first or top side 17 of the first structural element 2a in the region of the first through-opening 3 in this process. Next, a pivoting of the container 1 about, e.g., the transverse axis 23 of the container 1 takes place in accordance with FIG. 8, by which means the attachment device 6 is positioned above the second through-opening 7. After that, in accordance with FIG. 9 the container 1 can be moved in the mating direction 20, which can extend along the vertical axis 12 of the container 1, and as a result the latching tabs 13, 24 of the fastening device 5 and of the attachment device 6 can be inserted into the respective associated through-opening 3, 7 until the latching projections of these latching tabs 13, 24 at least partially engage behind the respective through-opening 3, 7. The final position of the container according to FIGS. 1 and 10 then results.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A fastening device configured for interlocking attachment in a through-opening of a structural element, the fastening device comprising:
   a contact surface for contact on a first side of the structural element delimiting the through-opening, the contact surface extends in a plane that is inclined or non-perpendicular relative to a direction of gravitational force;
   at least one first latching tab;
   at least one second latching tab, the at least one first and second latching tabs each have at least one latching projection,
   wherein the latching projections are configured to engage behind the through-opening on a second side of the structural element delimiting the through-opening,
   wherein a distance of the latching projection of the second latching tab from the contact surface is greater than a corresponding distance in the case of the first latching tab, and
   wherein the contact surface is composed of a multiplicity of partial contact surfaces that are spaced apart from one another.

2. The fastening device according to claim 1, further comprising at least two first and second latching tabs, wherein at least one second latching tab is arranged between two first latching tabs and at least one first latching tab is arranged between two second latching tabs.

3. The fastening device according to claim 1, wherein latching tabs have an outer surface that extends in a curve in the transverse direction.

4. The fastening device according to claim 3, wherein the outer surfaces of the latching tabs define a circle or an oval.

5. The fastening device according to claim 1, wherein the contact surface lies in a plane that is non-perpendicular to the longitudinal extents of the latching tabs.

6. The fastening device according to claim 1, wherein the width and/or the thickness of the at least one second latching tab is greater than the corresponding extent of the at least one first latching tab.

7. The fastening device according to claim 1, wherein the partial contact surfaces are each composed of a contact projection, and wherein the contact projections protrude from a support surface of the fastening device.

8. The fastening device according to claim 1, wherein the latching projection of the at least one first latching tab and/or the latching projection of the at least one second latching tab is/are designed as an end face of a wedge-shaped section of the respective latching tab.

9. The fastening device according to claim 1, wherein the longitudinal extent of the latching tabs is greater than the shortest distance of the contact surface from the free end of the respective latching tab.

10. A container comprising a fastening device according to claim 1.

11. The container according to claim 10, further comprising an attachment device that is configured for attachment to the structural element or to an additional structural element.

12. The container according to claim 11, wherein the attachment device is arranged to be spaced apart from the fastening device relative to a longitudinal axis and a transverse axis and a vertical axis of the container.

13. A combination of a fastening device according to claim 1 and a container comprising the fastening device and a structural element or structural elements.

14. A motor vehicle comprising the combination according to claim 13.

15. The fastening device according to claim 1, wherein the at least one latching projection is formed between a stem and a head of each latching tab.

16. The fastening device according to claim 7, wherein the contact projections are T-shaped or I-shaped.

17. The fastening device according to claim 16, wherein the fastening device comprises six contact projections, and wherein the T-shaped and the I-shaped contact projections alternate in an annular arrangement.

\* \* \* \* \*